US012003704B2

(12) United States Patent
Huo et al.

(10) Patent No.: US 12,003,704 B2
(45) Date of Patent: *Jun. 4, 2024

(54) METHODS FOR ENCODING AND DECODING PICTURES AND ASSOCIATED APPARATUS

(71) Applicant: GUANGDONG OPPO MOBILE TELECOMMUNICATIONS CORP., LTD., Guangdong (CN)

(72) Inventors: Junyan Huo, Dongguan (CN); Shuai Wan, Dongguan (CN); Yanzhuo Ma, Dongguan (CN); Haixin Wang, Dongguan (CN); Fuzheng Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,883

(22) Filed: Oct. 19, 2022

(65) Prior Publication Data

US 2023/0053024 A1  Feb. 16, 2023

Related U.S. Application Data

(63) Continuation of application No. 17/579,795, filed on Jan. 20, 2022, now Pat. No. 11,503,280, which is a continuation of application No. PCT/CN2019/124365, filed on Dec. 10, 2019.

(51) Int. Cl.
*H04N 19/105* (2014.01)
*H04N 19/132* (2014.01)
*H04N 19/159* (2014.01)
*H04N 19/176* (2014.01)

(52) U.S. Cl.
CPC ......... *H04N 19/105* (2014.11); *H04N 19/132* (2014.11); *H04N 19/159* (2014.11); *H04N 19/176* (2014.11)

(58) Field of Classification Search
None
See application file for complete search history.

(56) References Cited

U.S. PATENT DOCUMENTS 11,503,280 B2 * 11/2022 Huo .................... H04N 19/132

* cited by examiner

*Primary Examiner* — Christopher G Findley
(74) *Attorney, Agent, or Firm* — PERKINS COIE LLP

(57) ABSTRACT

A method for decoding a picture, a method for encoding a picture, an encoder, and a decoder are provided. The method for encoding a picture includes (i) determining a width and a height of a coding block in the picture; (ii) if the width and the height are equal to N, where N is a positive integer power of 2, determining a matrix-based intra prediction (MIP) size identifier indicating that an MIP prediction size equal to N; (iii) deriving a group of reference samples of the coding block; and (iv) deriving an MIP prediction of the coding block based on the group of reference samples and an MIP matrix corresponding to the MIP size identifier.

14 Claims, 7 Drawing Sheets

METHODS FOR ENCODING AND DECODING PICTURES AND ASSOCIATED APPARATUS

CROSS-REFERENCE TO RELATED APPLICATION(S)

This application is a continuation of U.S. patent application Ser. No. 17/579,795, field Jan. 20, 2022, which claims priority to International Application No. PCT/CN2019/124365, filed Dec. 10, 2019, the disclosures of which are hereby incorporated by reference in their entireties.

TECHNICAL FIELD

The present disclosure relates to the field of telecommunication technologies, and in particular, to a method for encoding and decoding pictures such as pictures or videos.

BACKGROUND

Versatile Video Coding (VVC) is a next generation video compression standard used to replace a current standard such as High Efficiency Video Coding standard (H.265/HEVC). The VVC coding standard provides higher coding quality than the current standard. To achieve this goal, various intra and inter prediction modes are considered. When using these prediction modes, a video can be compressed such that data to be transmitted in a bitstream (in binary form) can be reduced. Matrix-based Intra Prediction (MIP) is one of these modes. The MIP is an intra prediction mode. When implementing under the MIP mode, an encoder (or coder) or a decoder can derive an intra prediction block based on a current block (e.g., a group of bits or digits that is transmitted as a unit and that may be encoded and/or decoded together). However, deriving such prediction blocks may require significant amount of computational resources and additional storage spaces. Therefore, an improved method for addressing this issue is advantageous and desirable.

SUMMARY

In an aspect, a method for encoding a picture is provided. The method includes the following. A width and a height of a coding block in the picture is determined. If the width and the height are equal to N, a matrix-based intra prediction (MIP) size identifier is determined, where N is a positive integer power of 2, and the MIP size identifier indicates that an MIP prediction size equal to N. A group of reference samples of the coding block is derived. An MIP prediction of the coding block is derived based on the group of reference samples and an MIP matrix according to the MIP size identifier as follows. The MIP prediction of the coding block is derived based on following equations: $oW=(1<<(sW-1))-fO*(\Sigma_{i=0}^{inSize-1} p[i])$, and $predMip[x][y]=(((\Sigma_{i=0}^{inSize-1} mWeight[i][y*predSize+x]*p[i])+oW)>>sW)+pTemp[0]$, for x from 0 to "predSize-1", for y from 0 to "predSize-1", where "sW" represents a shifting number parameter, "fO" represents a shifting offset parameter, "oW" represents a parameter based on the shifting offset parameter and the shifting number parameter, "inSize" represents a variable indicating the number of reference samples used in deriving the MIP prediction, "p[i]" represents a reference sample, "predMip[x] [y]" represents the MIP prediction, "mWeight[i][j]" represents an MIP weighting matrix, "predSize" represents a size of the MIP prediction, "pTemp[0]" represents the 0-th value in a reference sample buffer, symbol "<<" represents a binary left shifting operator, and symbol ">>" represents a binary right shifting operator. The shifting offset parameter is determined. The MIP prediction of the coding block is derived based on the group of reference samples, the shifting offset parameter, and the MIP matrix according to the MIP size identifier, where different MIP size identifiers correspond to the same shifting offset parameter, and the shifting offset parameter is a constant equal to 32.

In another aspect, a method for decoding a picture is provided. The method includes the following. A bitstream is parsed to determine a width, a height and a prediction mode of a coding block. When the prediction mode indicates a MIP mode is used in decoding the coding block, if the width and the height are equal to N, an MIP size identifier is determined, where the MIP size identifier indicates that an MIP prediction size equal to N, and N is a positive integer power of 2. A group of reference samples of the coding block is derived. An MIP prediction of the coding block is derived based on the group of reference samples and an MIP matrix corresponding to the MIP size identifier as follows. The MIP prediction of the coding block is derived based on following equations: $oW=(1<<(sW-1))-fO*(\Sigma_{i=0}^{inSize-1} p[i])$, and $predMip[x][y]=(((\Sigma_{i=0}^{inSize-1} mWeight[i][y*predSize+x]*p[i])+oW)>>sW)+pTemp[0]$, for x from 0 to "predSize-1", for y from 0 to "predSize-1", where "sW" represents a shifting number parameter, "fO" represents a shifting offset parameter, "oW" represents a parameter based on the shifting offset parameter and the shifting number parameter, "inSize" represents a variable indicating the number of reference samples used in deriving the MIP prediction, "p[i]" represents a reference sample, "predMip[x] [y]" represents the MIP prediction, "mWeight[i][j]" represents an MIP weighting matrix, "predSize" represents a size of the MIP prediction, "pTemp[0]" represents the 0-th value in a reference sample buffer, symbol "<<" represents a binary left shifting operator, and symbol ">>" represents a binary right shifting operator. The shifting offset parameter is determined. The MIP prediction of the coding block is derived based on the group of reference samples, the shifting offset parameter, and the MIP matrix according to the MIP size identifier, where different MIP size identifiers correspond to the same shifting offset parameter, and the shifting offset parameter is a constant equal to 32.

In another aspect, an encoding apparatus for encoding a picture is provided. The encoding apparatus includes a partition unit, a prediction unit, and an entropy coding unit. The partition unit is configured to receive an input picture and divide the input picture into one or more coding blocks. The prediction unit is configured to determine a width and a height of the coding block. If the width and the height are equal to N, the prediction unit is configured to determine a MIP size identifier indicating that an MIP prediction size equal to N. N is a positive integer power of 2. The prediction unit is configured to derive a group of reference samples of the coding block, and the prediction unit is configured to derive an MIP prediction of the coding block based on the group of reference samples and an MIP matrix according to the MIP size identifier as follows. The MIP prediction of the coding block is derived based on following equations: $oW=(1<<(sW-1))-fO*(\Sigma_{i=0}^{inSize-1} p[i])$, and $predMip[x][y]=(((\Sigma_{i=0}^{inSize-1} mWeight[i][y*predSize+x]*p[i])+oW)>>sW)+pTemp[0]$, for x from 0 to "predSize-1", for y from 0 to "predSize-1", where "sW" represents a shifting number parameter, "fO" represents a shifting offset parameter, "oW" represents a parameter based on the shifting offset parameter and the shifting number parameter, "inSize" represents a variable indicating the number of reference samples used in deriving the MIP prediction, "p[i]" represents a reference sample, "predMip[x][y]" represents the MIP prediction, "mWeight[i][j]" represents an MIP weighting matrix, "predSize" represents a size of the MIP prediction, "pTemp[0]" represents the 0-th value in a reference sample buffer, symbol "<<" represents a binary left shifting operator, and symbol ">>" represents a binary right shifting operator. The shifting offset parameter is determined. The MIP prediction of the coding block is derived based on the group of reference samples, the shifting offset parameter, and the MIP matrix according to the MIP size identifier, where different MIP size identifiers correspond to the same shifting offset parameter, and the shifting offset parameter is a constant equal to 32. The entropy coding unit is configured to transform parameters to derive the MIP prediction into a bitstream.

In another aspect, a decoding apparatus for decoding a picture is provided. The decoding apparatus includes a parsing unit and an intra prediction unit. The parsing unit is configured to parse a bitstream to determine a width, a height and a prediction mode of a coding block. The intra prediction unit is configured to, when the prediction mode indicates a MIP mode is used in decoding the coding block, determine an MIP size identifier indicating that an MIP prediction size equal to N, if the width and the height are equal to N, where N is a positive integer power of 2. The intra prediction unit is configured to derive a group of reference samples of the coding block, and the intra prediction unit is configured to derive an MIP prediction of the coding block based on the group of reference samples and an MIP matrix corresponding to the MIP size identifier as follows. The MIP prediction of the coding block is derived based on following equations: $oW=(1<<(sW-1))-fO*(\Sigma_{i=0}^{inSize-1}p[i])$, and $predMip[x][y]=(((\Sigma_{i=0}^{inSize-1}mWeight[i][y*predSize+x]*p[i])+oW)>>sW)+pTemp[0]$, for x from 0 to "predSize-1", for y from 0 to "predSize-1", where "sW" represents a shifting number parameter, "fO" represents a shifting offset parameter, "oW" represents a parameter based on the shifting offset parameter and the shifting number parameter, "inSize" represents a variable indicating the number of reference samples used in deriving the MIP prediction, "p[i]" represents a reference sample, "predMip[x][y]" represents the MIP prediction, "mWeight[i][j]" represents an MIP weighting matrix, "predSize" represents a size of the MIP prediction, "pTemp[0]" represents the 0-th value in a reference sample buffer, symbol "<<" represents a binary left shifting operator, and symbol ">>" represents a binary right shifting operator. The shifting offset parameter is determined. The MIP prediction of the coding block is derived based on the group of reference samples, the shifting offset parameter, and the MIP matrix according to the MIP size identifier, where different MIP size identifiers correspond to the same shifting offset parameter, and the shifting offset parameter is a constant equal to 32.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration, but not for limitation. It should be understood that, one skilled in the art may acquire other drawings based on these drawings, without making any inventive work.

DETAILED DESCRIPTION

Figure 1:
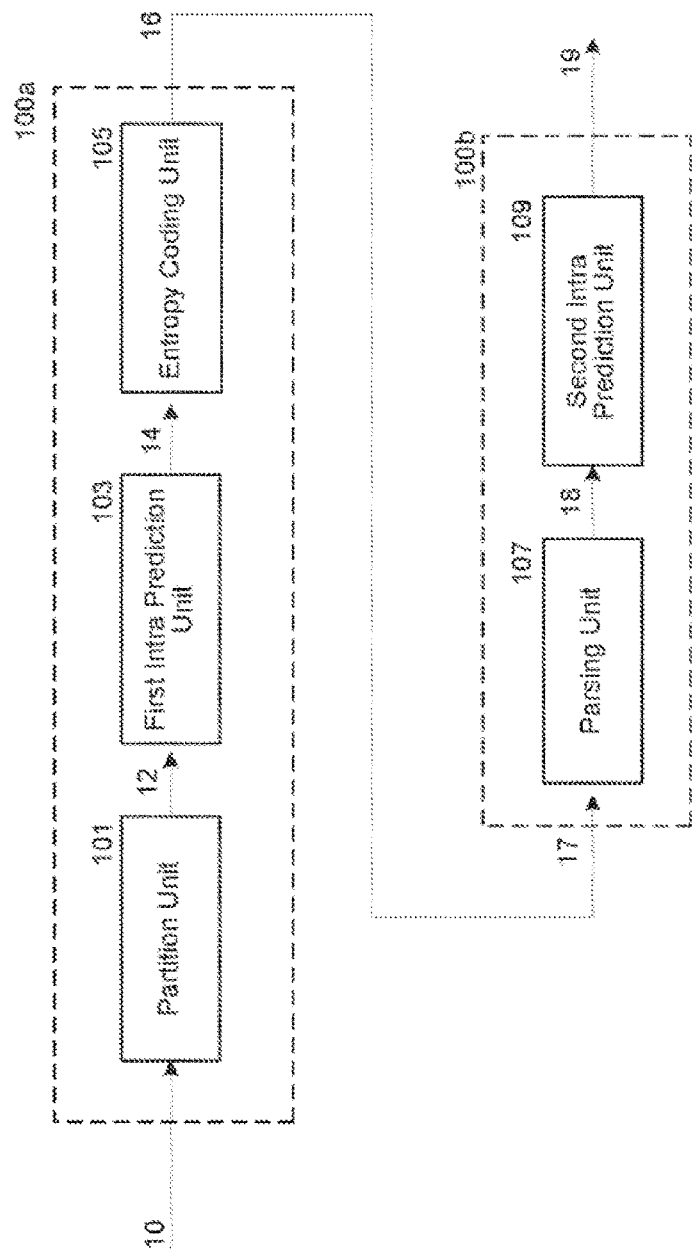
FIG. 1 is a schematic diagram of a system according to an embodiment of the present disclosure.

In order to facilitate the understanding of the present disclosure, the present disclosure will be described more fully hereinafter with reference to the accompanying drawings.

Under a current MIP mode, to generate a prediction block of a current block, the size of the prediction block is smaller than the size of the current block. For example, an "8×8" current block can have a "4×4" prediction block. Under the current MIP mode, an MIP prediction block with its size smaller than the current block is derived by performing a matrix calculation, which consumes less computational resources than performing the matrix calculation with a larger block. After the matrix calculation, an upsampling process is applied to the MIP prediction block to derive an intra prediction block that is of the same size of the current block. For example, an "8×8" intra prediction block can be derived from a "4×4" MIP prediction block by invoking the upsampling process of interpolation and/or extrapolation. The present disclosure provides a method for implementing the MIP mode without the up-sampling process, thereby significantly reducing computational complexity and increasing overall efficiency. More particularly, when implementing the MIP mode, the present method determines a suitable size identifier (or an MIP size identifier) such that the size of an MIP prediction block (e.g., "8×8") is the same as the size of a current block ("8×8") such that there is no need to perform an up-sampling process.

Embodiments of the present disclosure provide a method for encoding a picture. The method can also be applied to encode a video consisting of a sequence of pictures. The method includes, for example, (i) determining a width and a height of a coding block (e.g., an encoding block) in a picture; (ii) if the width and the height are "N," ("N" is a positive integer power of 2), determining a matrix-based intra prediction (MIP) size identifier, indicating that an MIP prediction size equal to "N;" (iii) deriving a group of reference samples for the coding block (e.g., using neighboring samples of the coding block); (iv) deriving an MIP prediction of the coding block using the group of reference samples and an MIP weight matrix according to the MIP size identifier; and (v) setting a prediction of the coding block equal to the MIP prediction of the coding block. In some embodiment, the method further comprises generating a bitstream based on the prediction of the coding block.

According to another aspect of the present disclosure, the method for decoding a picture can include, for example, (a) parsing a bitstream to determine a width, a height and a prediction mode (e.g., whether the bitstream indicates that an MIP mode was used) of a coding block (e.g., a decoding block); (b) if the width and the height are "N" and the MIP mode was used, determining an MIP size identifier indicating that an MIP prediction size equal to "N" ("N" is a positive integer power of 2); (c) deriving a group of reference samples for the coding block (e.g., using neighboring samples of the coding block); (d) deriving an MIP prediction of the coding block using the group of reference samples and an MIP matrix according to the MIP size identifier; (e) setting a prediction of the coding block equal to the MIP prediction of the coding block.

In some embodiments, the MIP prediction can include "N×N" prediction samples (e.g., "8×8"). In some embodiments, the MIP matrix can be selected from a group of predefined MIP matrices.

Another aspect of the present disclosure includes a system for encoding/decoding pictures and videos. The system can include an encoding sub-system (or an encoder) and a decoding sub-system (or a decoder). The encoding sub-system includes a partition unit, a first prediction unit, and an entropy coding unit. The partition unit is configured to receive an input video and divide the input video into one or more coding units (CUs). The first intra prediction unit is configured to generate a prediction block corresponding to each CU and an MIP size identifier derived from encoding the input video. The entropy coding unit is configured to transform the parameters for deriving the prediction block into a bitstream. The decoding sub-system includes a parsing unit and a second intra prediction unit. The parsing unit is configured to parse the bitstream to get numerical values (e.g., values associated with the one or more CUs). The second intra prediction unit is configured to convert the numerical values into an output video at least partially based on the MIP size identifier.

A CU may have a width and a height equal to "N," and "N" is a positive integer power of 2. The MIP size identifier indicates that an MIP prediction size used by the first intra prediction unit to generate an MIP prediction block is "N." For example, the MIP size identifier equal to "2" indicates that the MIP prediction size is "8×8".

FIG. 1 is a schematic diagram of a system 100 according to an embodiment of the present disclosure. The system 100 can encode, transmit, and decode a picture. The system 100 can also be applied to encode, transmit and decode a video consisting of a sequence of pictures. More particularly, the system 100 can receive input pictures, process the input pictures, and generate output pictures. The system 100 includes an encoding apparatus 100a and a decoding apparatus 100b. The encoding apparatus 100a includes a partition unit 101, a first intra prediction unit 103, and an entropy coding unit 105. The decoding apparatus 100b includes a parsing unit 107 and a second intra prediction unit 109.

The partition unit 101 is configured to receive an input video 10 and then divide the input video 10 into one or more coding tree units (CTUs) or coding units (CUs) 12. The CUs 12 are transmitted to the first intra prediction unit 103. The first intra prediction unit 103 is configured to derive a prediction block for each of the CUs 12 by performing an MIP process. Based on the sizes of the CUs 12, the MIP process has different approaches to handle the CUs 12 with different sizes. For each type of CUs 12, it has a designated MIP size identifier (e.g., 0, 1, 2, etc.). The MIP size identifier is used to derive a size of an MIP prediction block (i.e. a variable "predSize"), a number of reference samples from an above or left boundary of the CU (i.e. a variable "boundarySize") and to select MIP matrix from a number of predefined MIP matrices. For example, when the MIP size identifier is "0," the size of the MIP prediction block is "4×4" (e.g., "predSize" is set equal to 4) and "boundarySize" is set equal to 2; when MIP size identifier is "1," "predSize" is set equal to 4 and boundarySize is set equal to 2; and when MIP size identifier is "2," "predSize" is set equal to 8 and "boundarySize" is set equal to 4.

The first intra prediction unit 103 first determines a width and a height of the CU 12. For example, the first intra prediction unit 103 can determine that the CU 12 has a height of "8" and a width of "8." In this example, the width and the height are "8." Accordingly, the first intra prediction unit 103 determines that the MIP size identifier of the CU 12 is "2," which indicates that the size of MIP prediction is "8×8." The first intra prediction unit 103 further derives a group of reference samples for the CU 12 (e.g., using neighboring samples of the CU 12, such as above- or left-neighboring samples, discussed in detail with reference to FIG. 3). The first intra prediction unit 103 then derives an MIP prediction of the CU 12 based on the group of reference samples and corresponding MIP matrix. The first intra prediction unit 103 can use the MIP prediction as an intra prediction 14 of the CU 12. The intra prediction 14 and parameters for deriving the intra prediction 14 are then transmitted to the entropy coding unit 105 for further process.

The entropy coding unit 105 is configured to transform the parameters for deriving the intra prediction 14 into binary form. Accordingly, the entropy coding unit 105 generates a bitstream 16 based on the intra prediction 14. In some embodiments, the bitstream 16 can be transmitted via a communication network or stored in a disc or a server.

The decoding apparatus 100b receives the bitstream 16 as input bitstream 17. The parsing unit 107 parses the input bitstream 17 (in binary form) and converts it into numerical values 18. The numerical values 18 is indicative of the characteristics (e.g., color, brightness, depth, etc.) of the input video 10. The numerical values 18 is transmitted to the second intra prediction unit 109. The second intra prediction unit 109 can then convert these numerical values 18 into an output video 19 (e.g., based on processes similar to those performed by the first intra prediction unit 103; relevant embodiments are discussed in detail with reference to FIG. 4). The output video 19 can then be stored, transmitted, and/or rendered by an external device (e.g., a storage, a transmitter, etc.). The stored video can further be displayed by a display.

Figure 2:
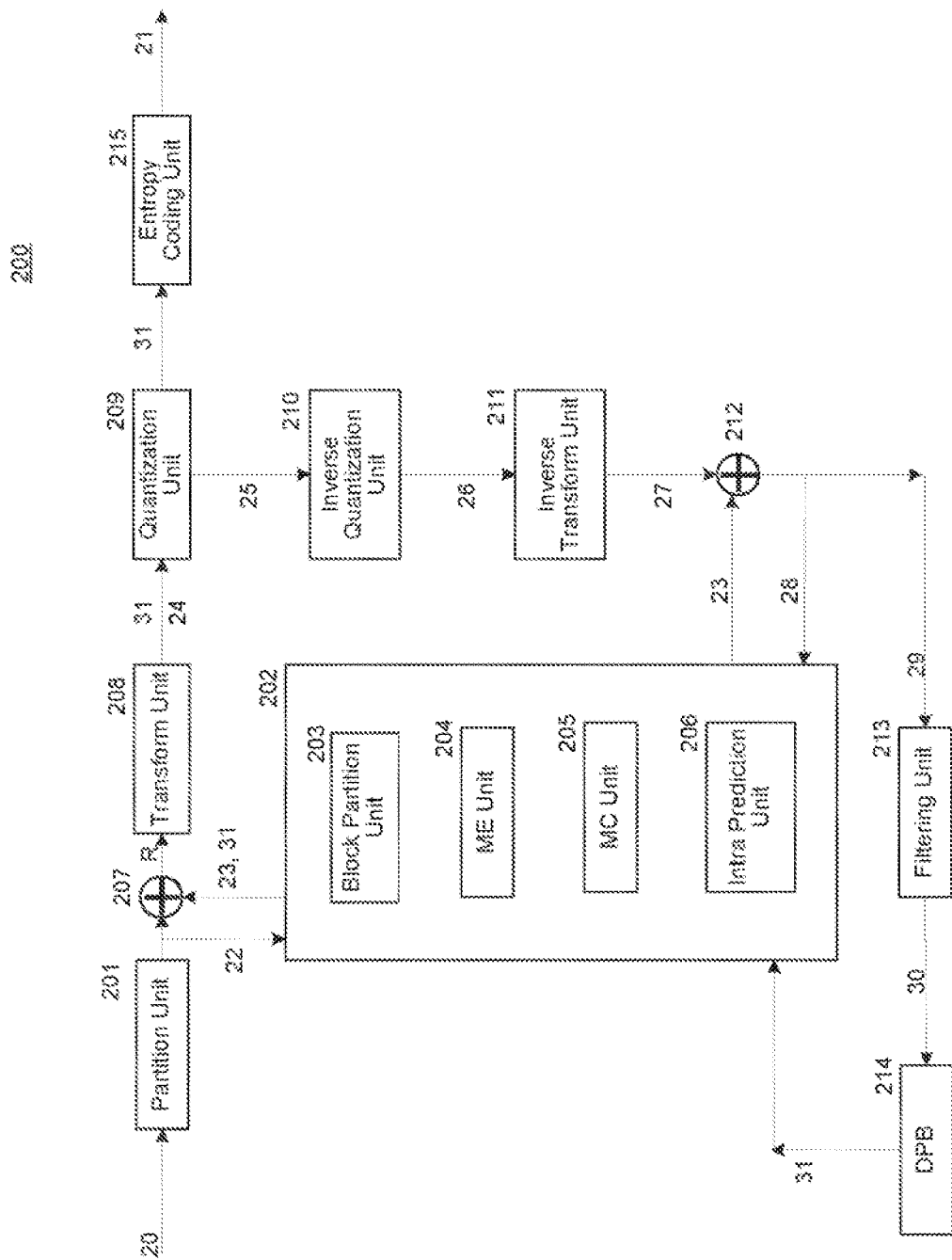
FIG. 2 is a schematic diagram of an encoding system according to an embodiment of the present disclosure.

FIG. 2 is a schematic diagram of an encoding system 200 according to an embodiment of the present disclosure. The encoding system 200 is configured to encode, compress, and/or process an input picture 20 and generate an output bitstream 21 in binary form. The encoding system 200 includes a partition unit 201 configured to divide the input picture 20 into one or more coding tree units (CTUs) 22. In some embodiments, the partition unit 201 can divide the picture into slices, tiles, and/or bricks. Each of the bricks can contain one or more integral and/or partial CTUs 22. In some embodiments, the partition unit 201 can also form one or more subpictures, each of which can contain one or more slices, tiles or bricks. The partition unit 201 transmits the CTUs 22 to a prediction unit 202 for further process.

The prediction unit 202 is configured to generate a prediction block 23 for each of the CTUs 22. The prediction block 23 can be generated based on one or more inter or intra prediction methods by using various interpolation and/or extrapolation schemes. As shown in FIG. 2, the prediction unit 202 can further include a block partition unit 203, an ME (motion estimation) unit 204, an MC (motion compensation) unit 205, and an intra prediction unit 206. The block partition unit 203 is configured to divide the CTUs 22 into smaller coding units (CUs) or coding blocks (CBs). In some embodiments, the CUs can be generated from the CTUs 22 by various methods such as quadtree split, binary split, and ternary split. The ME unit 204 is configured to estimate a change resulting from a movement of an object shown in the input picture 20 or a movement of a picture capturing device that generates the input picture 20. The MC unit 205 is configured to adjust and compensate a change resulting from the foregoing movement. Both the ME unit 204 and the MC unit 205 are configured to derive an inter (e.g., at different time points) prediction block of a CU. In some embodiments, the ME unit 204 and the MC unit 205 can use a rate-distortion optimized motion estimation method to derive the inter prediction block.

The intra prediction unit 206 is configured to derive an intra (e.g., at the same time point) prediction block of a CU (or a portion of the CU) using various intra prediction modes including MIP modes. Details of deriving of an intra prediction block using an MIP mode (referred to as "MIP process" hereinafter) is discussed with reference to FIG. 3. During the MIP process, the intra prediction unit 206 first derives one or more reference samples from neighboring samples of the CU, by, for example, directly using the neighboring samples as the reference samples, downsampling the neighboring samples, or directly extracting from the neighboring samples (e.g., Step 301 of FIG. 3).

Second, the intra prediction unit 206 derives predicted samples at multiple sample positions in the CU using the reference samples, an MIP matrix and a shifting parameter. The sample positions can be preset sample positions in the CU. For example, the sample positions can be positions with odd horizontal and vertical coordinate values within the CU (e.g., x=1, 3, 5, etc.; y=1, 3, 5, etc.). The shifting parameter includes a shifting offset parameter and a shifting number parameter, which can be used in shifting operations in generating the predicted samples. By this arrangement, the intra prediction unit 206 can generate predicted samples in the CU (i.e., "MIP prediction" or "MIP prediction block" refers to a collection of such predicted samples) (e.g., Step 302 of FIG. 3). In some embodiments, the sample positions can be positions with even horizontal and vertical coordinate values within the CU.

Figure 3:
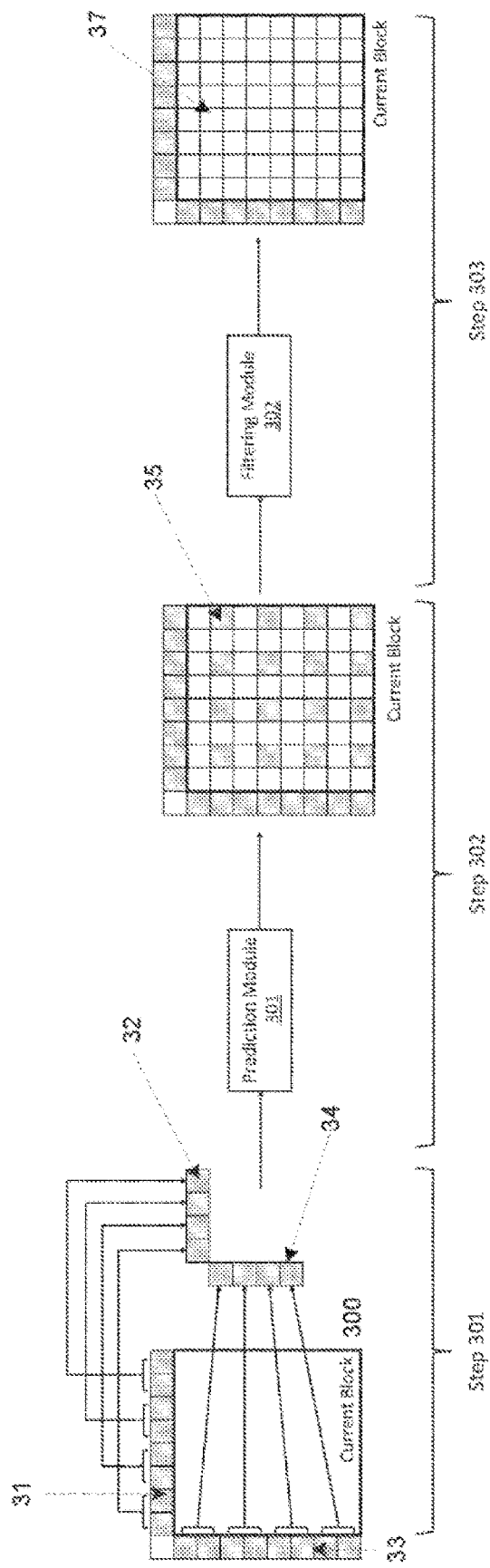
FIG. 3 is a schematic diagram illustrating derivation of an intra prediction block using an MIP mode in accordance with embodiments of the present disclosure.

Third, the intra prediction unit 206 can derive predicted samples at remaining positions (e.g., those are not sample positions) of the CU (e.g., Step 303 of FIG. 3). In some embodiments, the intra prediction unit 206 can use an interpolation filter to derive the predicted samples at the remaining positions. By the foregoing processes, the intra prediction unit 206 can generate the prediction block 23 for the CU in the CTU 22.

Referring to FIG. 2, the prediction unit 202 outputs the prediction block 23 to an adder 207. The adder 207 calculates a difference (e.g., a residual R) between the output (e.g., a CU in the CTUs 22) of the partition unit 201 and the output (i.e., the prediction block 23 of the CU) of the prediction block 202. A transform unit 208 reads the residual R, and performs one or more transform operations on the prediction block 23 to get coefficients 24 for further uses. A quantization unit 209 can quantize the coefficients 24 and outputs quantized coefficients 25 (e.g., levels) to an inverse quantization unit 210. The inverse quantization unit 210 performs scaling operations on the quantized coefficients 25 to output reconstructed coefficients 26 to an inverse transform unit 211. The inverse transform unit 211 performs one or more inverse transforms corresponding to the transforms in the transform unit 208 and outputs reconstructed residual 27.

An adder 212 then calculates reconstructed CU by adding the reconstructed residual 27 and the prediction block 23 of the CU from the prediction unit 202. The adder 212 also forwards its output 28 to the prediction unit 202 to be used as an intra prediction reference. After all the CUs in the CTUs 22 have been reconstructed, a filtering unit 213 can perform an in-loop filtering on a reconstructed picture 29. The filtering unit 213 contains one or more filters, for example, a deblocking filter, a sample adaptive offset (SAO) filter, an adaptive loop filter (ALF), a luma mapping with chroma scaling (LMCS) filter, a neural-network-based filter and other suitable filters for suppressing coding distortions or enhancing coding quality of a picture.

The filtering unit 213 can then send a decoded picture 30 (or subpicture) to a decoded picture buffer (DPB) 214. The DPB 214 outputs decoded picture 31 based on controlling information. The picture 31 stored in the DPB 214 may also be employed as a reference picture for performing inter or intra prediction by the prediction unit 202.

An entropy coding unit 215 is configured to convert the pictures 31, parameters from the units in the encoding system 200, and supplemental information (e.g., information for controlling or communicating with the system 200) into binary form. The entropy coding unit 215 can generate the output bitstream 21 accordingly.

In some embodiments, the encoding system 200 can be a computing device with a processor and a storage medium with one or more encoding programs. When the processor reads and executes the encoding programs, the encoding system 200 can receive the input picture 20 and accordingly generates the output bitstream 21. In some embodiments, the encoding system 200 can be a computing device with one or more chips. The units or elements of the encoding system 200 can be implemented as integrated circuits on the chips.

FIG. 3 is a schematic diagram illustrating an MIP process in accordance with embodiments of the present disclosure. The MIP process can be implemented by an intra prediction unit (e.g., the intra prediction unit 206). As shown in FIG. 3, the intra prediction unit can include a prediction module 301 and a filtering module 302. As also shown in FIG. 3, the MIP process includes three Steps 301, 302, and 303. The MIP process can generate a predicted block based on a current block or a coding block 300 (such as a CU or partitions of a CU).

Step 301

In Step 301, the intra prediction unit can use neighboring samples 31, 33 of the coding block 300 to generate reference samples 32, 34. In the illustrated embodiment, the neighboring samples 31 are above-neighboring samples, and the neighboring samples 33 are left-neighboring samples. The intra prediction unit 206 can calculate an average of the values of every two neighboring samples 31, 33 and set the average of the values as the values of the reference samples 32, 34, respectively. In some embodiments, the intra prediction unit 206 can select the value of one from every two neighboring samples 31 or 33 as the value of the reference sample 32 or 32. In the illustrated embodiments, the intra prediction unit 206 derives 4 reference samples 32 from 8 above-neighboring samples 31 of the coding block 300, and another 4 reference samples 34 from 8 left-neighboring samples 33 of the coding block 300.

In Step 301, the intra prediction unit determines a width and a height of the coding block 300 and denotes them as variables "cbWidth" and "cbHeight," respectively. In some embodiments, the intra prediction unit 206 can adopt a rate-distortion optimized mode decision process to determine an intra prediction mode (e.g., whether an MIP mode is used). In such embodiments, the coding block 300 can be partitioned into one or more transform blocks, whose width and height are noted as variables "nTbW" and "nTbH," respectively. When the MIP mode is used as the intra prediction mode, the intra prediction unit determines an MIP size identifier (denoted as variable "mipSizeId") based on the following conditions A-C.

[CONDITION A] If both "nTbW" and "nTbH" are 4, set "mipSizeId" as 0.
[CONDITION B] Otherwise, if either "cbWidth" or "cbHeight" is 4, set "mipSizeId" as 1.
[CONDITION C] Otherwise, set "mipSizeId" as 2.

As an example, if the size of the coding block 300 is "8×8" (i.e. both "cbWidth" and "cbHeight" are 8), then "mipSizeId" is set as 2. As another example, if the size of the transformed block of the coding block 300 is "4×4" (i.e. both "nTbW" and "nTbH" are 4), then "mipSizeId" is set as 0. As yet another example, if the size of the coding block 300 is "4×8," then "mipSizeId" is set as 1.

In the illustrated embodiments, there are three types of "mipSizeId," which are "0," "1," and "2." Each type of MIP size identifiers (i.e., variable "mipSizeId") corresponds to a specific way of performing the MIP process (e.g., use different MIP matrices). In other embodiments, there can be more than three types of MIP size identifiers.

Based on the MIP size identifier, the intra prediction unit can determine variables "boundarySize" and "predSize" based on the following conditions D-F.

[CONDITION D] If "mipSizeId" is 0, set "boundarySize" as 2 and "predSize" as 4.
[CONDITION E] If "mipSizeId" is 1, set "boundarySize" as 4 and "predSize" as 4.
[CONDITION F] If "mipSizeId" is 2, set "boundarySize" as 4 and "predSize" as 8.

In the illustrated embodiments, "boundarySize" represents a number of reference samples 32, 34 derived from each of the above-neighboring samples 31 and the left-neighboring samples 33 of the coding block 300. Variable "predSize" is to be used in a later calculation (i.e., equation (C) below).

In some embodiments, the intra prediction unit can also derive variable "isTransposed" to indicate the order of reference samples 32, 34 stored in a temporal array. For example, "isTransposed:" being 0 indicates that the intra prediction unit presents the reference samples 32 derived from the above-neighboring samples 31 of the coding block 300 ahead of the reference samples 34 derived from the left-neighboring samples 33. Alternatively, "isTransposed" being 1 indicates that the intra prediction unit presents the reference samples 34 derived from the left-neighboring samples 33 of the coding block 300 ahead of the reference samples 32 derived from the above-neighboring samples 31. In an implementation of the encoding system 200, the value of "isTransposed" is sent to an entropy coding unit (e.g., the entropy coding unit 215) as one of the parameters of the MIP process that is coded and written into a bitstream (e.g., the output bitstream 21). Correspondingly, in an implementation of a decoding system 400 in FIG. 4 described in this disclosure, the value of "isTransposed" can be received from a parsing unit (e.g., parsing unit 401) by parsing an input bitstream (which can be the output bitstream 21).

The intra prediction unit can further determine a variable "inSize" to indicate the number of reference samples 32, 34 used in deriving an MIP prediction. A value of "inSize" is determined by the following equation (A). In this disclosure, meanings and operations of all operators in equations are the same as the counterpart operators that are defined in the ITU-T H.265 standard.

$$\text{inSize}=(2*\text{boundarySize})-(\text{mipSizeId}==2)?1:0; \quad (A)$$

For example, "==" is a relational operator "Equal to". For example, if "mipSizeId" is 2, then "inSize" is 7 (calculated by (2*4)−1). If "mipSizeId" is 1, then "inSize" is 8 (calculated by (2*4)−0).

The intra prediction unit can invoke the following process to derive a group of reference samples 32, 34, which are stored in array p[x] ("x" is from "0" to "inSize-1"). The intra prediction unit can derive "nTbW" samples from the above-neighboring samples 31 of the coding block 300 (and store them in array "refT") and "nTbH" samples from the left-neighboring samples 33 (and store them in array "refL") of the coding block 300.

The intra prediction unit can initial a downsampling process on "refT" to get "boundarySize" samples and store the "boundarySize samples" in "refT." Similarly, the intra prediction unit 206 can initiate the downsampling process on "refL" to get "boundarySize" samples and store the "boundarySize" samples in "refL."

In some embodiments, the intra prediction unit can incorporate arrays "refT" and "refL" into a single array "pTemp" based on the order indicated by a variable "isTransposed." The intra prediction unit can derive "isTransposed" to indicate the order of reference samples stored in a temporal array "pTemp." For example, "isTransposed" being 0 (or FALSE) indicates that the intra prediction unit presents the reference samples 32 derived from the above-neighboring samples 31 of the coding block 300 ahead of the reference samples 34 derived from the left-neighboring samples 33. In other cases, "isTransposed" being 1 (or TRUE) indicates that the intra prediction unit presents the reference samples 34 derived from the left-neighboring samples 33 of the coding block 300 ahead of the reference samples 32 derived from the above-neighboring samples 31. In some embodiments, in an implementation of the encoding system 200, the intra prediction unit can determine a value of "isTransposed" by using a rate-distortion optimization method. In some embodiments, in an implementation of the encoding system 200, the intra prediction unit can determine the value of "isTransposed" based on comparisons and/or correlations between neighboring samples 32, 34 and the coding block 300. In an implementation of the encoding system 200, the value of "isTransposed" can be forwarded to the entropy coding unit (e.g., the entropy coding unit 215) as one of the parameters of the MIP process to be written in the bitstream (e.g., the output bitstream 21). Correspondingly, in an implementation of a decoding system 400 in FIG. 4 described in this disclosure, the value of "isTransposed" can be received from a parsing unit (e.g. parsing unit 401) by parsing an input bitstream (which can be the output bitstream 21).

The intra prediction unit can determine array p[x] (x from "0" to "inSize-1") based on the following conditions G and H.

[CONDITION G] If "mipSizeId" is 2, p[x]=pTemp[x+1]−pTemp[0].
[CONDITION H] Otherwise (e.g., "mipSizeId" is less than 2), p[0]=pTemp[0]−(1<<(BitDepth-1)) and p[x]=pTemp[x]−pTemp[0] (for x from 1 to "inSize-1").

In the above condition H, "BitDepth" is a bitdepth of a color component of a sample (e.g., Y component) in the coding block 300. The symbol "<<" is a bit shifting symbol used in the ITU-T H.265 standard.

Alternatively, the intra prediction unit can derive array p[x] (for x from 0 to "inSize-1" based on the following conditions I and J.

[CONDITION I] If "mipSizeId" is 2, p[x]=pTemp[x+1]-pTemp[0].

[CONDITION J] Otherwise (e.g., "mipSizeId" is less than 2), p[0]=(1<<(BitDepth-1))-pTemp[0] and p[x]=pTemp[x]-pTemp[0] (for x from 1 to "inSize-1").

In some embodiments, the intra prediction unit can determine the values of array p[x] by using a unified calculation method without judging the value of "mipSizeId." For example, the intra prediction unit can append "(1<<(Bit-Depth-1))" as an additional element in "pTemp," and calculate p[x] as "pTemp[x]-pTemp[0]."

Step 302

In Step 302, the intra prediction unit (or the prediction module 301) derives the MIP prediction of the coding block 300 by using the group of reference samples 32, 34 and an MIP matrix. The MIP matrix is selected from a group of predefined MIP matrices based on its corresponding MIP mode identifier (i.e., variable "mipModeId") and the MIP size identifier (i.e. variable "mipSizeId").

The MIP prediction derived by the intra prediction unit includes partial predicted samples 35 of all or partial sample positions in the coding block 300. The MIP prediction is denoted as "predMip[x][y]."

In the illustrated embodiment in FIG. 3, partial predicted samples 35 are samples marked as grey squares in the current block 300. The reference samples 32, 34 in array p[x] derived in Step 301 are used as an input to the prediction module 301. The prediction module 301 calculates the partial predicted samples 35 by using the MIP matrix and a shifting parameter. The shifting parameter includes a shifting offset parameter and a shifting number parameter. In some embodiment, the prediction module 301 derives the partial predicted sample 35 with its coordinate (x, y) based on the following equations (B) and (C):

$$oW=(1<<(sW-1))-fO*(\Sigma_{i=0}^{inSize-1}p[i]) \quad (B)$$

$$predMip[x][y]=(((\Sigma_{i=0}^{inSize-1}mWeight[i][y*predSize+x]*p[i])+oW)>>sW)+pTemp[0] (\text{for } x \text{ from 0 to "predSize-1", for } y \text{ from 0 to "predSize-1"}) \quad (C)$$

In equation (B) above, parameter "fO" is a shifting offset parameter which is used to determine parameter "oW." Parameter "sW" is a shifting number parameter. "p[i]" is reference sample. Symbol ">>" is a binary right shifting operator as defined in the H.265 standard.

In equation (C) above, "mWeight[i][j]" is an MIP weighting matrix in which matrix elements are fixed constants for both encoding and decoding. Alternatively, in some embodiments, an implementation of the encoding system 200 uses adaptive MIP matrix. For example, the MIP weighting matrix can be updated by various training methods using one or more coded pictures as input, or using pictures provided to the encoding system 200 by external means. The intra prediction unit can forward "mWeight[i][j]" to the entropy coding unit (e.g., the entropy coding unit 215) when an MIP mode is determined. The entropy coding unit can then write "mWeight[i][j]" in the bitstream, e.g. in one or more special data units in the bitstream containing MIP data. Correspondingly, in some embodiments, an implementation of a decoding system 400 with adaptive MIP matrix can update MIP matrix using, for example, training method with input of one or more coded pictures or blocks or pictures from other bitstream provided to the decoder 200 by external meanings, or obtained from parsing unit 401 by parsing special data units in the input bitstream containing MIP matrix data.

The prediction unit 301 can determine the values of "sW" and "fO" based on the size of the current block 300 and the MIP mode used for the current block 300. In some embodiments, the prediction unit 301 can obtain the values of "sW" and "fO" by using a look-up table. For example, Table 1 below can be used to determine "sW."

TABLE 1

| sW | | | | | | | | | | | modeId | | | | | | | |
|---|---|---|---|---|---|---|---|---|---|---|---|---|---|---|---|---|---|---|
| MipSizeId | 0 | 1 | 2 | 3 | 4 | 5 | 6 | 7 | 8 | 9 | 10 | 11 | 12 | 13 | 14 | 15 | 16 | 17 |
| 0 | 6 | 6 | 6 | 5 | 6 | 5 | 5 | 6 | 5 | 6 | 6 | 6 | 6 | 6 | 5 | 6 | 5 | 5 |
| 1 | 6 | 6 | 6 | 6 | 6 | 6 | 6 | 6 | 7 | | | | | | | | | |
| 2 | 7 | 5 | 6 | 6 | 6 | 6 | | | | | | | | | | | | |

Alternatively, Table 2 below can also be used to determine "sW."

TABLE 2

| MipSizeId | sW |
|---|---|
| 0 | 5 |
| 1 | 6 |
| 2 | 5 |

In some embodiments, the prediction module can set "sW" as a constant. For example, the prediction module can "sW" as "5" for blocks of various sizes with different MIP modes. As another example, the prediction module 301 can set "sW" as "6" for blocks of various sizes with different MIP modes. As yet another example, the prediction module can set "sW" as "7" for blocks of various sizes with different MIP modes.

In some embodiments, the prediction unit 301 can use Table 3 or Table 4 below to determine "fO."

TABLE 3

| fO | | | | | | | | | | | modeID | | | | | | | |
|---|---|---|---|---|---|---|---|---|---|---|---|---|---|---|---|---|---|---|
| MipSizeId | 0 | 1 | 2 | 3 | 4 | 5 | 6 | 7 | 8 | 9 | 10 | 11 | 12 | 13 | 14 | 15 | 16 | 17 |
| 0 | 34 | 19 | 7 | 32 | 27 | 24 | 21 | 13 | 24 | 15 | 27 | 20 | 16 | 7 | 20 | 23 | 21 | 24 |
| 1 | 17 | 20 | 11 | 21 | 17 | 11 | 23 | 10 | 21 | 11 | | | | | | | | |
| 2 | 8 | 46 | 16 | 10 | 13 | 11 | | | | | | | | | | | | |

TABLE 4

| MipSizeId | fO |
|---|---|
| 0 | 34 |
| 1 | 23 |
| 2 | 46 |

In some embodiments, the prediction module 301 can directly set "fO" as a constant (e.g., a value from 0 to 100). For example, the prediction module 301 can set "fO" as "46" for blocks of various sizes with different MIP modes. As another example, the prediction module 301 can set "fO" as "56." As yet another example, the prediction module 301 can set "fO" as "66."

In some embodiments, the intra prediction unit can perform a "clipping" operation on the value of the MIP prediction samples stored in array "predMip." When "isTransposed" is 1 (or TRUE), the "predSize×preSize" array "predMip[x][y]" (for x from 0 to "predSize-1; for y from 0 to "predSize-1") is transposed as "predTemp[y][x]=predMip[x][y]" and then "predMip=predTemp."

More particularly, when the size of the coding block 303 is "8×8" (i.e. both "cbWidth" and "cbHeight" are 8), the intra prediction unit can derive an "8×8" "predMip" array.

Step 303

In Step 303 in FIG. 3, the intra prediction unit derives predicted samples 37 of the remaining samples other than the partial samples 35 in the coding block 300. As shown in FIG. 3, the intra prediction unit can use the filtering module 302 to derive the predicted samples 37 of the remaining samples other than the partial samples 35 in the coding block 300. An input to the filtering module 302 can be the partial samples 35 in step 302. The filtering module 302 can use one or more interpolation filters to derive the predicted samples 37 of the remaining samples other than the partial samples 35 in the coding block 300. The intra prediction unit (or the filtering module 302) can generate a prediction (which includes multiple predicted samples 37) of the coding block 300 and store prediction 37 in an array "predSamples[x][y]" (for x from 0 to "nTbW-1," for y from 0 to "nTbH-1") according to the following conditions K and L.

[CONDITION K] If the intra prediction unit determines that "nTbW" is greater than "predSize" or that "nTbH" is greater than "predSize," the intra prediction unit initiates an upsampling process to derive "predSamples" based on "predMip."

[CONDITION L] Otherwise, the intra prediction unit sets the prediction of the coding block 300 as the MIP prediction of the coding block.

In other words, the intra prediction unit can set "predSamples[x][y] (for x from 0 to "nTbW-1", for y from 0 to "nTbH-1") being equal to "predMip[x][y]." For example, the intra prediction unit can set "predSamples" for a coding block with its size equal to "8×8" (i.e. both "cbWidth" and "cbHeight" are 8) as its "predMip[x][y]."

Through the Steps 301-303, the intra prediction unit can generate the prediction of the current block 300. The generated prediction can be used for further processed (e.g., the prediction block 23 discussed above with reference to FIG. 2).

Figure 4:
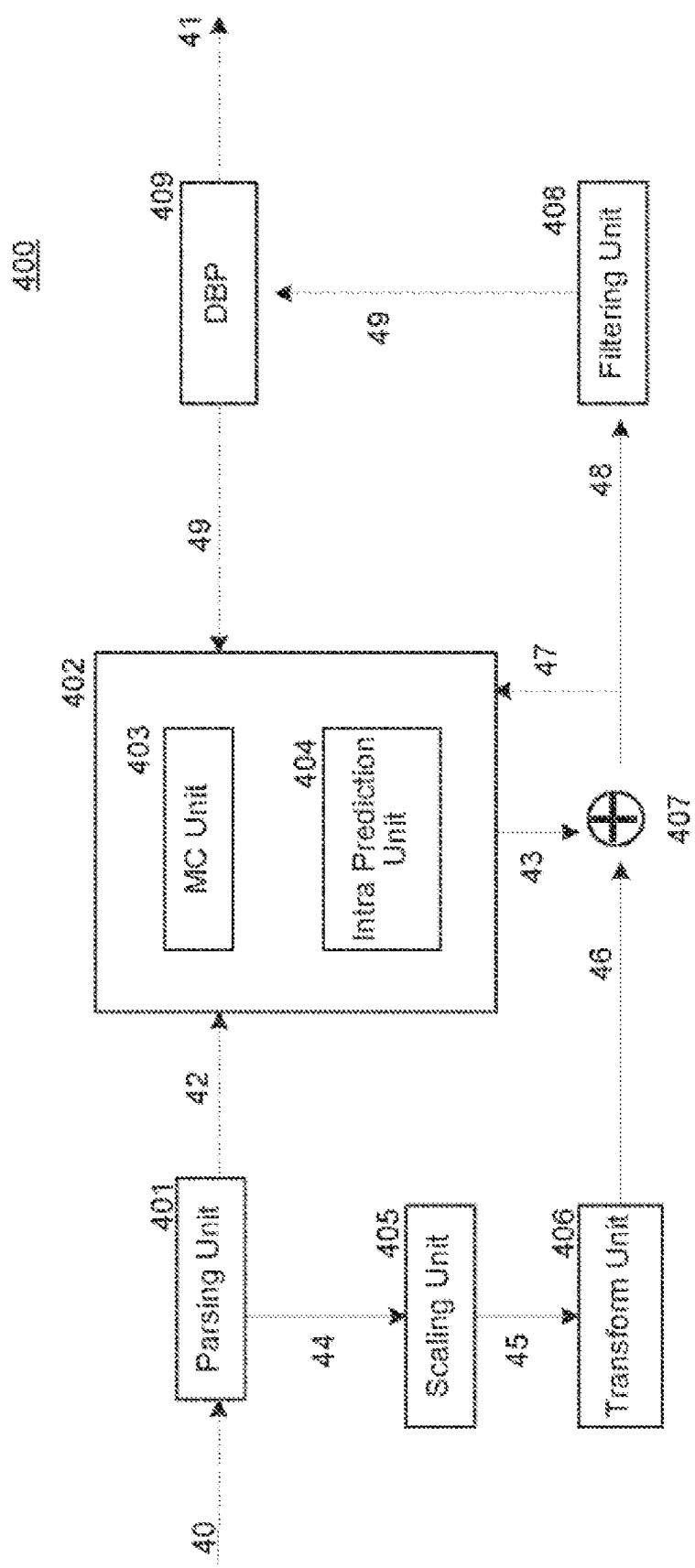
FIG. 4 is a schematic diagram of a decoding system according to an embodiment of the present disclosure.

FIG. 4 is a schematic diagram of a decoding system 400 according to an embodiment of the present disclosure. The decoding system 400 is configured to receive, process, and transform an input bitstream 40 to an output video 41. The input bitstream 40 can be a bitstream representing a compressed/coded picture/video. In some embodiments, the input bitstream 40 can be from an output bitstream (e.g., the output bitstream 21) generated by an encoding system (such as the encoding system 200).

The decoding system 400 includes a parsing unit 401 configured to parse the input bitstream 40 to obtain values of syntax elements therefrom. The parsing unit 401 also converts binary representations of the syntax elements to numerical values (i.e. a decoding block 42) and forwards the numerical values to a prediction unit 402 (e.g., for decoding). In some embodiments, the parsing unit 401 can also forward one or more variables and/or parameters for decoding the numerical values to the prediction unit 402.

The prediction unit 402 is configured to determine a prediction block 43 of the decoding block 42 (e.g., a CU or a partition of a CU, such as a transform block). When it is indicated that an inter coding mode was used to decode the decoding block 42, an MC (motion compensation) unit 403 of the prediction unit 402 can receive relevant parameters from the parsing unit 401 and accordingly decode under the inter coding mode. When it is indicated that an intra prediction mode (e.g., an MIP mode) is used to decode the decoding block 42, an intra prediction unit 404 of the prediction unit 402 receives relevant parameters from the parsing unit 401 and accordingly decodes under the indicated intra coding mode. In some embodiments, the intra prediction mode (e.g., the MIP mode) can be identified by a specific flag (e.g., an MIP flag) embedded in the input bitstream 40.

For example, when the MIP mode is identified, the intra prediction unit 404 can determine the prediction block 43 (which includes multiple predicted samples) based on the following methods (similar to the Steps 301-303 described in FIG. 3).

First, the intra prediction unit 404 derives one or more reference samples from neighboring samples of the decoding block 42 (similar to Step 301 in FIG. 3). For example, the intra prediction unit 404 can generate the reference samples by downsampling the neighboring samples, or directly extracting a portion from the neighboring samples.

The intra prediction unit 404 can then derive partial predicted samples in the decoding block 42 using the reference samples, an MIP matrix and a shifting parameter (similar to Step 302 in FIG. 3). In some embodiments, the positions of the partial predicted samples can be preset in the decoding clock 42. For example, the positions of the partial predicted samples can be positions with odd horizontal and vertical coordinate values within the coding block. The shifting parameter can include a shifting offset parameter and a shifting number parameter, which can be used in shifting operations in generating the partial predicted samples.

Finally, if the partial predicted samples of the decoding block 42 are derived, the intra prediction unit 404 derives predicted samples of the remaining samples other than the partial predicted samples in the decoding block 42 (similar to Step 303 in FIG. 3). For example, the intra prediction unit 404 can use an interpolation filter to derive the predicted samples, by using the partial predicted samples and the neighboring samples as inputs of the interpolation filter.

The decoding system 400 includes a scaling unit 405 with functions similar to those of the inverse quantization unit 210 of the encoding system 200. The scaling unit 405 performs scaling operations on quantized coefficients 44 (e.g., levels) from the parsing unit 401 so as to generate reconstructed coefficients 45.

A transform unit 406 has functions similar to those of the inverse transform unit 211 in the encoding system 200. The transform unit 406 performs one or more transform operations (e.g., inverse operations of one or more transform operations by the inverse transform unit 211) to get reconstructed residual 46.

An adder 407 adds the prediction block 43 from the prediction unit 402 and the reconstructed residual 46 from the transform unit 406 to get a reconstructed block 47 of the decoding block 42. The reconstructed block 47 is also sent to the prediction unit 402 to be used as a reference (e.g., for other blocks coded in an intra prediction mode).

After all the decoding block 42 in a picture or a subpicture have been reconstructed (i.e., a reconstructed block 48 is formed), a filtering unit 408 can perform an in-loop filtering on the reconstructed block 49. The filtering unit 408 contains one or more filters such as a deblocking filter, a sample adaptive offset (SAO) filter, an adaptive loop filter (ALF), a luma mapping with chroma scaling (LMCS) filter, a neural-network-based filter, etc. In some embodiments, the filtering unit 408 can perform the in-loop filtering on only one or more target pixels in the reconstructed block 48.

The filtering unit 408 then send a decoded picture 49 (or picture) or subpicture to a DPB (decoded picture buffer) 409. The DPB 409 outputs decoded pictures as the output video 41 based on timing and controlling information. Decoded pictures 49 stored in the DPB 409 can also be employed as a reference picture by the prediction unit 402 when performing an inter or intra prediction.

In some embodiment, the decoding system 400 can be a computing device with a processor and a storage medium recording one or more decoding programs. When the processor reads and executes the decoding programs, the decoding system 400 can receive an input video bitstream and generate corresponding decoded video.

In some embodiments, the decoding system 400 can be a computing device with one or more chips. The units or elements of the decoding system 400 can be implemented as integrated circuits on the chips.

Figure 5:
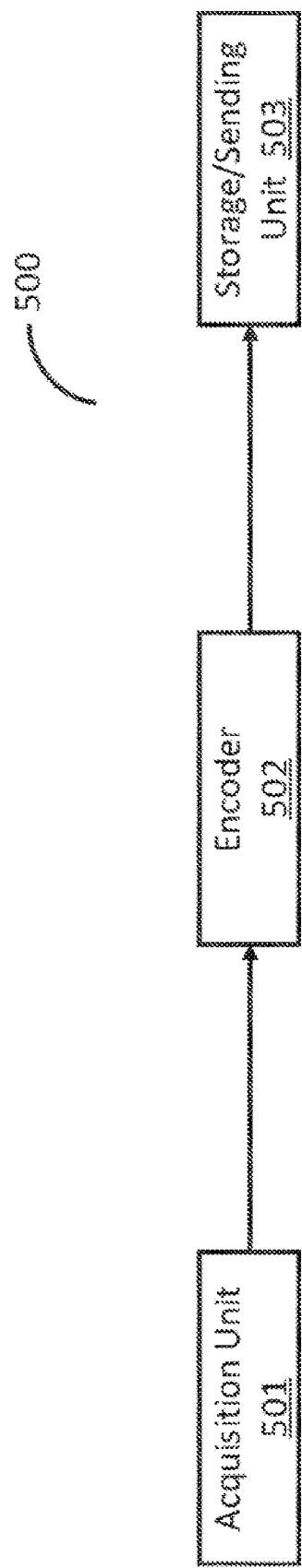
FIG. 5 is a schematic diagram of an apparatus (e.g., encoder) according to an embodiment of the present disclosure.

FIG. 5 is a schematic diagram of an apparatus 500 according to an embodiment of the present disclosure. The apparatus 500 can be a "sending" apparatus. More particularly, the apparatus 500 is configured to acquire, encode, and store/send one or more pictures. The apparatus 500 includes an acquisition unit 501, an encoder 502, and a storage/sending unit 503.

The acquisition unit 501 is configured to acquire or receive a picture and forward the picture to the encoder 502. The acquisition unit 501 can also be configured to acquire or receive a video consisting of a sequence of pictures and forward the video to the encoder 502. In some embodiments, the acquisition unit 501 can be a device containing one or more cameras (e.g., picture cameras, depth cameras, etc.). In some embodiments, the acquisition unit 501 can be a device that can partially or completely decode a video bitstream to generate a picture or a video. The acquisition unit 501 can also contain one or more elements to capture audio signal.

The encoder 502 is configured to encode the picture from the acquisition unit 501 and generates a video bitstream. The encoder 502 can also be configured to encode the video from the acquisition unit 501 and generates the bitstream. In some embodiment, the encoder 502 can be implemented as the encoding system 200 described in FIG. 2. In some embodiments, the encoder 502 can contain one or more audio encoders to encode audio signals to generate an audio bitstream.

The storage/sending unit 503 is configured to receive one or both of the video and audio bitstreams from the encoder 502. The storage/sending unit 503 can encapsulate the video bitstream together with the audio bitstream to form a media file (e.g., an ISO-based media file) or a transport stream. In some embodiments, the storage/sending unit 503 can write or store the media file or the transport stream in a storage unit, such as a hard drive, a disk, a DVD, a cloud storage, a portable memory device, etc. In some embodiments, the storage/sending unit 503 can send the video/audio bitstreams to an external device via a transport network, such as the Internet, a wired networks, a cellular network, a wireless local area network, etc.

Figure 6:
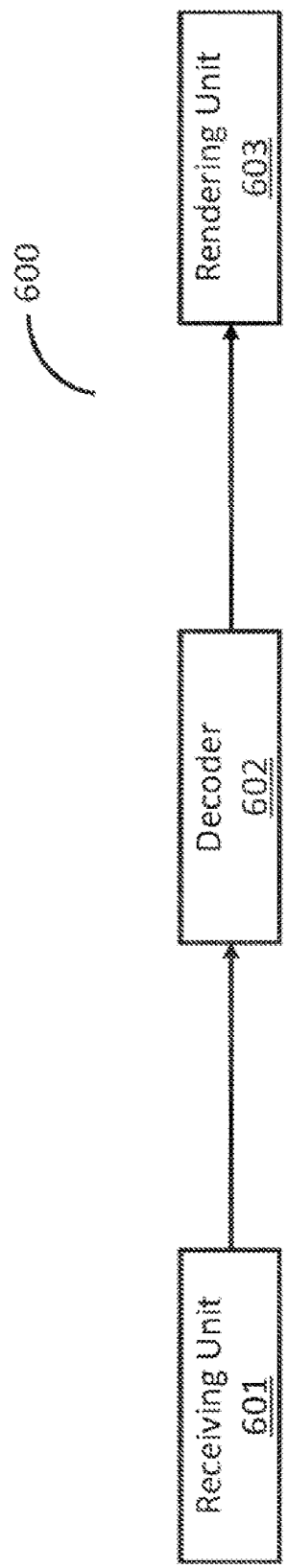
FIG. 6 is a schematic diagram of an apparatus (e.g., decoder) according to an embodiment of the present disclosure.

FIG. 6 is a schematic diagram of an apparatus 600 according to an embodiment of the present disclosure. The apparatus 600 can be a "destination" apparatus. More particularly, the apparatus 600 is configured to receive, decode, and render picture or video. The apparatus 600 includes a receiving unit 601, a decoder 602, and a rendering unit 603.

The receiving unit 601 is configured to receive a media file or a transport stream, e.g., from a network or a storage device. The media file or the transport stream includes a video bitstream and/or an audio bitstream. The receiving unit 601 can separate the video bitstream and the audio bitstream. In some embodiments, the receiving unit 601 can generate a new video/audio bitstream by extracting the video/audio bitstream.

The decoder 602 includes one or more video decoders such as the decoding system 400 discussed above. The decoder 602 can also contain one or more audio decoders. The decoder 602 decodes the video bitstream and/or the audio bitstream from the receiving unit 601 to get a decoded video file and/or one or more decoded audio files (corresponding to one or multiple channels).

The rendering unit 603 receives the decoded video/audio files and processes the video/audio files to get suitable video/audio signal for displaying/playing. These adjusting/reconstructing operations can include one or more of the following: denoising, synthesis, conversion of color space, upsampling, downsampling, etc. The rendering unit 603 can improve qualities of the decoded video/audio files.

Figure 7:
FIG. 7 is a schematic diagram of a communication system according to an embodiment of the present disclosure.

FIG. 7 is a schematic diagram of a communication system 700 according to an embodiment of the present disclosure. The communication system 700 includes a source device 701, a storage medium or transport network 702, and a destination device 703. In some embodiments, the source device 701 can be the apparatus 500 described above with reference to FIG. 5. The source device 701 sends media files to the storage medium or transport network 702 for storing or transporting the same. The destination device 703 can be the apparatus 600 described above with reference to FIG. 6. The communication system 700 is configured to encode a media file, transport or store the encoded media file, and then decode the encoded media file. In some embodiments, the source device 701 can be a first smartphone, the storage medium 702 can be a cloud storage, and the destination device can be a second smartphone.

The above-described embodiments are merely illustrative of several embodiments of the present disclosure, and the description thereof is specific and detailed. The above embodiments cannot be construed to limit the present disclosure. It should be noted that, a number of variations and modifications may be made by those skilled in the art without departing from the spirit and scope of the disclosure. Therefore, the scope of the present disclosure should be subject to the appended claims.

What is claimed is:

1. A method for decoding a picture, comprising:
parsing a bitstream to determine a width, a height and a prediction mode of a coding block;
when the prediction mode indicates a matrix-based intra prediction (MIP) mode is used in decoding the coding block, if the width and the height are equal to N, determining an MIP size identifier indicating that an MIP prediction size equal to N, wherein N is a positive integer power of 2;
deriving a group of reference samples of the coding block; and
deriving an MIP prediction of the coding block based on the group of reference samples and an MIP matrix corresponding to the MIP size identifier by:

deriving the MIP prediction of the coding block based on following equations:

$$oW=(1<<(sW-1))-fO*(\Sigma_{i=0}^{inSize-1}p[i]), \text{ and}$$

$$\text{predMip}[x][y]=(((\Sigma_{i=0}^{inSize-1}\text{mWeight}[i][y*\text{predSize}+x]*p[i])+oW)>>sW)+\text{pTemp}[0](\text{for } x \text{ from 0 to "predSize-1", for } y \text{ from 0 to "predSize-1"}),$$

wherein "sW" represents a shifting number parameter, "fO" represents a shifting offset parameter, "oW" represents a parameter based on the shifting offset parameter and the shifting number parameter, "inSize" represents a variable indicating the number of reference samples used in deriving the MIP prediction, "p[i]" represents a reference sample, "predMip[x][y]" represents the MIP prediction, "mWeight [i][j]" represents an MIP weighting matrix, "predSize" represents a size of the MIP prediction, "pTemp[0]" represents the 0-th value in a reference sample buffer, symbol "<<" represents a binary left shifting operator, and symbol ">>" represents a binary right shifting operator;

determining the shifting offset parameter; and deriving the MIP prediction of the coding block based on the group of reference samples, the shifting offset parameter, and the MIP matrix according to the MIP size identifier, wherein different MIP size identifiers correspond to the same shifting offset parameter, and the shifting offset parameter is a constant equal to 32.

2. The method of claim 1, further comprising:

downsampling the group of reference samples of the coding block to obtain the reference sample buffer, wherein the reference sample buffer contains the downsampled group of reference samples of the coding block; and determining an input sample according to reference samples in the reference sample buffer, the MIP size identifier, and a bitdepth of luminance component.

3. The method of claim 2, wherein determining the input sample according to reference samples in the reference sample buffer, the MIP size identifier, and the bitdepth of luminance component comprises:

deriving the input sample based on following conditions:
if the MIP size identifier is equal to 2, p[x]=pTemp[x+1]−pTemp[0];
if the MIP size identifier is less than 2, $$\begin{cases} p[0] = (1 \ll (BitDepth - 1) - pTemp[0] \\ p[x] = pTemp[x] - pTemp[0] \text{ for } x = 1, \ldots, inSize - 1 \end{cases}$$

wherein "p[x]" represents the reference sample, "pTemp [x]" represents the x-th value in the reference sample buffer, and "BitDepth" represents the bitdepth of luminance component.

4. The method of claim 3, wherein
the MIP size identifier is set as 0 on condition that the width and the height of the coding block are equal to 4;
the MIP size identifier is set as 1 on condition that the width x height is equal to N×4, 4×N, or 8×8; or
the MIP size identifier is set as 2 on condition that the width and the height of the coding block are not equal to 4 and the width×height is not equal to N×4, 4×N, or 8×8.

5. The method of claim 1, further comprising deriving the group of reference samples of the coding block based on neighboring samples, wherein the neighboring samples include above-neighboring samples and/or left-neighboring samples.

6. The method of claim 1, further comprising setting a prediction of the coding block equal to the MIP prediction of the coding block.

7. A method for encoding a picture, comprising:
determining a width and a height of a coding block in the picture;
if the width and the height are equal to N, wherein N is a positive integer power of 2, determining a matrix-based intra prediction (MIP) size identifier indicating that an MIP prediction size equal to N;
deriving a group of reference samples of the coding block; and
deriving an MIP prediction of the coding block based on the group of reference samples and an MIP matrix according to the MIP size identifier by:
deriving the MIP prediction of the coding block based on following equations:

$$oW=(1<<(sW-1))-fO*(\Sigma_{i=0}^{inSize-1}p[i]), \text{ and}$$

$$\text{predMip}[x][y]=(((\Sigma_{i=0}^{inSize-1}\text{mWeight}[i][y*\text{predSize}+x]*p[i])+oW)>>sW)+\text{pTemp}[0](\text{for } x \text{ from 0 to "predSize-1", for } y \text{ from 0 to "predSize-1"}),$$

wherein "sW" represents a shifting number parameter, "fO" represents a shifting offset parameter, "oW" represents a parameter based on the shifting offset parameter and the shifting number parameter, "inSize" represents a variable indicating the number of reference samples used in deriving the MIP prediction, "p[i]" represents a reference sample, "predMip[x][y]" represents the MIP prediction, "mWeight [i][j]" represents an MIP weighting matrix, "predSize" represents a size of the MIP prediction, "pTemp[0]" represents the 0-th value in a reference sample buffer, symbol "<<" represents a binary left shifting operator, and symbol ">>" represents a binary right shifting operator;

determining the shifting offset parameter; and deriving the MIP prediction of the coding block based on the group of reference samples, the shifting offset parameter, and the MIP matrix according to the MIP size identifier, wherein different MIP size identifiers correspond to the same shifting offset parameter, and the shifting offset parameter is a constant equal to 32.

8. The method of claim 7, further comprising:

downsampling the group of reference samples of the coding block to obtain the reference sample buffer, wherein the reference sample buffer contains the downsampled group of reference samples of the coding block; and determining an input sample according to reference samples in the reference sample buffer, the MIP size identifier, and a bitdepth of luminance component.

9. The method of claim 8, wherein determining the input sample according to reference samples in the reference sample buffer, the MIP size identifier, and the bitdepth of luminance component comprises:

deriving the input sample based on following conditions:
if the MIP size identifier is equal to 2, p[x]=pTemp[x+1]−pTemp[0];
if the MIP size identifier is less than 2, $$\begin{cases} p[0] = (1 \ll (BitDepth - 1)) - pTemp[0] \\ p[x] = pTemp[x] - pTemp[0] \text{ for } x = 1, \ldots, inSize - 1 \end{cases}$$

wherein "p[x]" represents the reference sample, "pTemp [x]" represents the x-th value in the reference sample buffer, and "BitDepth" represents the bitdepth of luminance component.

10. The method of claim 9, wherein
the MIP size identifier is set as 0 on condition that the width and the height of the coding block are equal to 4;
the MIP size identifier is set as 1 on condition that the width x height is equal to N×4, 4×N, or 8×8; or
the MIP size identifier is set as 2 on condition that the width and the height of the coding block are not equal to 4 and the width x height is not equal to N×4, 4×N, or 8×8.

11. The method of claim 7, further comprising deriving the group of reference samples of the coding block based on neighboring samples, wherein the neighboring samples include above-neighboring samples and/or left-neighboring samples.

12. The method of claim 7, further comprising setting a prediction of the coding block equal to the MIP prediction of the coding block.

13. A decoder for decoding a picture, comprising:
a processor; and
a memory storing one or more computer programs which, when executed by the processor, cause the processor to:
parse a bitstream to determine a width, a height and a prediction mode of a coding block; and
when the prediction mode indicates a matrix-based intra prediction (MIP) mode is used in decoding the coding block, determine an MIP size identifier indicating that an MIP prediction size equal to N, if the width and the height are equal to N, wherein N is a positive integer power of 2, and wherein the processor is configured to derive a group of reference samples of the coding block, and wherein the processor is configured to derive an MIP prediction of the coding block based on the group of reference samples and an MIP matrix corresponding to the MIP size identifier by:
deriving the MIP prediction of the coding block based on following equations:

$oW=(1<<(sW-1))-fO*(\Sigma_{i=0}^{inSize-1}p[i])$, and predMip[x][y]=((($\Sigma_{i=0}^{inSize-1}$mWeight[i][y*predSize+ x]*p[i])+oW)>>sW)+pTemp[0](for x from 0 to "predSize-1", for y from 0 to "predSize-1"), wherein "sW" represents a shifting number parameter, "fO" represents a shifting offset parameter, "oW" represents a parameter based on the shifting offset parameter and the shifting number parameter, "inSize" represents a variable indicating the number of reference samples used in deriving the MIP prediction, "p[i]" represents a reference sample, "predMip[x][y]" represents the MIP prediction, "mWeight [i][j]" represents an MIP weighting matrix, "predSize" represents a size of the MIP prediction, "pTemp[0]" represents the 0-th value in a reference sample buffer, symbol "<<" represents a binary left shifting operator, and symbol ">>" represents a binary right shifting operator;
determining the shifting offset parameter; and
deriving the MIP prediction of the coding block based on the group of reference samples, the shifting offset parameter, and the MIP matrix according to the MIP size identifier, wherein different MIP size identifiers correspond to the same shifting offset parameter, and the shifting offset parameter is a constant equal to 32.

14. An encoder for encoding a picture, comprising:
a processor; and
a memory storing one or more computer programs which, when executed by the processor, cause the processor to:
receive an input picture and divide the input picture into one or more coding blocks;
determine a width and a height of the coding block, wherein if the width and the height are equal to N, the processor is configured to determine a matrix-based intra prediction (MIP) size identifier indicating that an MIP prediction size equal to N, wherein N is a positive integer power of 2, and wherein the processor is configured to derive a group of reference samples of the coding block, and wherein the processor is configured to derive an MIP prediction of the coding block based on the group of reference samples and an MIP matrix according to the MIP size identifier by:
deriving the MIP prediction of the coding block based on following equations:

$oW=(1<<(sW-1))-fO*(\Sigma_{i=0}^{inSize-1}p[i])$, and predMip[x][y]=((($\Sigma_{i=0}^{inSize-1}$mWeight[i][y*predSize+ x]*p[i])+oW)>>sW)+pTemp[0](for x from 0 to "predSize-1", for y from 0 to "predSize-1"), wherein "sW" represents a shifting number parameter, "fO" represents a shifting offset parameter, "oW" represents a parameter based on the shifting offset parameter and the shifting number parameter, "inSize" represents a variable indicating the number of reference samples used in deriving the MIP prediction, "p[i]" represents a reference sample, "pred-Mip[x][y]" represents the MIP prediction, "mWeight [i][j]" represents an MIP weighting matrix, "predSize" represents a size of the MIP prediction, "pTemp[0]" represents the 0-th value in a reference sample buffer, symbol "<<" represents a binary left shifting operator, and symbol ">>" represents a binary right shifting operator; and
determining the shifting offset parameter; and
deriving the MIP prediction of the coding block based on the group of reference samples, the shifting offset parameter, and the MIP matrix according to the MIP size identifier, wherein different MIP size identifiers correspond to the same shifting offset parameter, and the shifting offset parameter is a constant equal to 32; and
transform parameters to derive the MIP prediction into a bitstream.

* * * * *